United States Patent [19]
Morisawa

[11] Patent Number: 4,793,209
[45] Date of Patent: Dec. 27, 1988

[54] FOUR-WHEEL-DRIVING SYSTEM HAVING A CONTINUOUSLY VARIABLE SUB-TRANSMISSION

[75] Inventor: Kunio Morisawa, Toyota, Japan

[73] Assignee: Toyota Jidosha Kabushiki Kaisha, Aichi, Japan

[21] Appl. No.: 38,326

[22] Filed: Apr. 14, 1987

[30] Foreign Application Priority Data

Apr. 25, 1986 [JP] Japan .................................. 61-97490

[51] Int. Cl.$^4$ ............................................. F16H 37/10
[52] U.S. Cl. .............................. 74/665 GE; 74/665 T; 74/740
[58] Field of Search ......... 74/665 F, 665 G, 665 GA, 74/665 GB, 665 GC, 665 GE, 665 H, 665 T, 681, 689, 740; 180/233, 247, 248, 249, 250; 192/58 B

[56] References Cited

U.S. PATENT DOCUMENTS

| | | | |
|---|---|---|---|
| 3,869,013 | 3/1975 | Pagdin et al. | 180/249 |
| 4,040,271 | 8/1977 | Rolt et al. | 192/58 B |
| 4,562,897 | 1/1986 | Renneker | 74/665 GA X |
| 4,576,061 | 3/1986 | Yamakawa et al. | 74/665 GA X |
| 4,669,559 | 6/1987 | Fukui | 180/233 X |
| 4,672,861 | 6/1987 | Lanzer | 74/665 GE |
| 4,676,336 | 6/1987 | Hiramatsu et al. | 180/248 X |
| 4,682,518 | 7/1987 | Takada et al. | 74/689 X |
| 4,703,842 | 11/1987 | Leinfellner et al. | 192/58 B |
| 4,714,129 | 12/1987 | Mueller | 180/247 X |
| 4,715,467 | 12/1987 | Sakai | 74/665 TX |

FOREIGN PATENT DOCUMENTS

| | | |
|---|---|---|
| 3404886 | 4/1985 | Fed. Rep. of Germany . |
| 3436759 | 4/1986 | Fed. Rep. of Germany ...... 180/248 |
| 3533142 | 4/1986 | Fed. Rep. of Germany ...... 180/248 |
| 3533143 | 4/1986 | Fed. Rep. of Germany . |
| 2172741 | 9/1973 | France . |
| 59-151661 | 8/1984 | Japan . |
| 60-203533 | 10/1985 | Japan . |
| 61-191434 | 8/1986 | Japan .................................. 180/248 |

OTHER PUBLICATIONS

All-Wheel Drive On-and Off-Road Requirements for Future All Wheel Drive Systems in Different Ranges of Application, by H. Lanzer, presented at the International All Wheel Drive Conference, 5–6 Mar. 1986, at The Institution of Mechanical Engineers.

*Primary Examiner*—Lawrence Staab
*Assistant Examiner*—Dwight G. Diehl
*Attorney, Agent, or Firm*—Parkhurst, Oliff & Berridge

[57] ABSTRACT

An improved four-wheel-driving system transmitting driving power to front and rear wheels which includes a viscous coupling, a sub-transmission of a continuously variable type coupled to one of the driving axles, and an actuator variably controlling the change gear ratio of the sub-transmission to control the ratio of driving power distributed between the front and rear wheels. The power distribution ratio is changed suitably to both the driving conditions and the road surface conditions. Further this four-wheel-driving system is lightweight and with low vibration in comparison with the conventional type using a center differential.

9 Claims, 11 Drawing Sheets

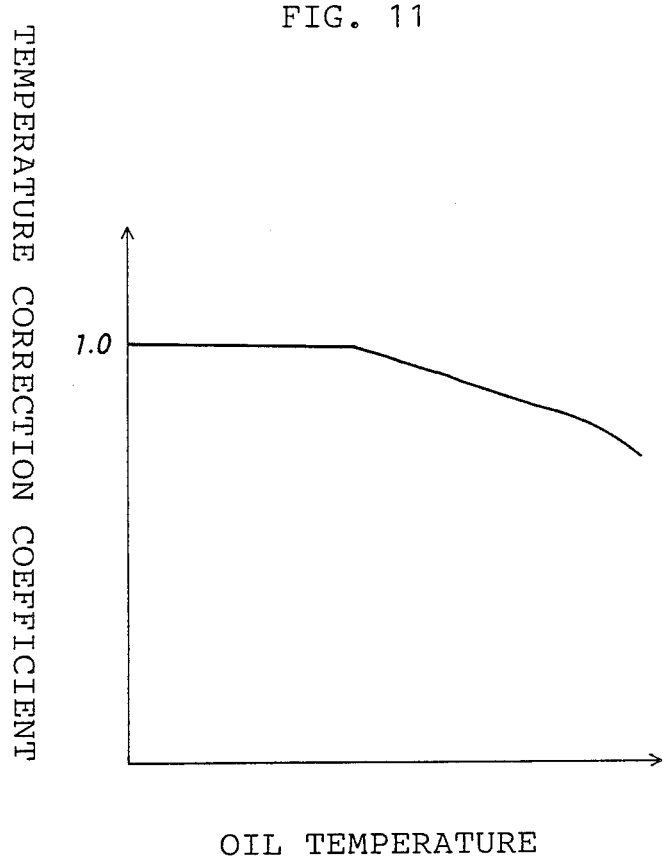

FOUR-WHEEL-DRIVING SYSTEM HAVING A CONTINUOUSLY VARIABLE SUB-TRANSMISSION

BACKGROUND OF THE INVENTION

1. Field of the Invention

The present invention relates to a four-wheel-driving system for varying the driving power distributed between front and rear wheels of a motor vehicle.

2. Prior Art

In order to allow a four-wheel-drive utility vehicle to make full use of its controllability and driving power, the driving power of a vehicle has, in the past, been distributed to the front and rear wheels in response to the road surface and the driving conditions. For example, the Published Japanese Patent Application sho No. 59-151661 discloses that a center differential, which distributes driving power between the front and rear wheels, is combined with a continuously variable transmission to obtain a predetermined distribution ratio of the driving power. In this case, differential gear devices are provided at the front and rear wheels, and further at center. Therefore, the output axle of the transmission rotates much faster than usual, thereby increasing noise and vibration. Since the center differential comprises additional gearing, the endurance thereof is liable to be reduced by the increased vibration.

SUMMARY OF THE INVENTION

It is an object of the present invention to provide a four-wheel-driving system in which the ratio of driving power distributed between the front and rear wheels is controlled in response to driving conditions and road surface conditions.

It is another object of the present invention to provide a four-wheel-driving system exhibiting weight reduction and low vibration as compared with the prior art.

According to the invention, a four-wheel-driving system is provided having two driving axles which transmit driving power provided from a main transmission respectively to front and rear wheels. The system comprises, a sub-transmission of the continuously variable type provided at one of the two axles, a viscous coupling having a plurality of plates provided at one of the two axles, the viscous coupling transmitting torque in accordance with the viscosity of viscous fluid among the plates, an actuator variably controlling the ratio of the driving power distributed between the front and rear wheels by adjusting the change gear ratio of the sub-transmission.

A viscous coupling and a sub-transmission of the continuously variable type are provided in a driving axle for transmitting driving power to front and rear wheels. The viscous coupling, as shown in FIG. 2, transmits torque in proportion to the difference $\Delta N$ between the two rotational speeds fo the input side of the coupling and the output side thereof.

An actuator variably controls the change gear ratio of the sub-transmission, that is, the ratio of rotational speed of the input side to the output side ($\omega in/\omega out$) of the sub-transmission. In accordance with the channge gear ratio, the difference of rotational speed between the input and output sides of the viscous coupling is varied. In accordance with the difference of rotational speed, the torque transmitted by the coupling is varied. Thereby, the ratio of driving power distributed between front and rear wheels can be varied suitably.

The present invention has no center differential so that the rotational speed of the output axle of the main transmission is decreased, thereby reducing noise, vibration, and the weight of the system.

The sub-transmission of continuously variable type comprises a belt to vary speed contninuously.

BRIEF DESCRIPTION OF THE DRAWINGS

This and other objects, features, and advantages of the invention will become more apparent upon reading the following detailed specification and drawings, in which:

FIG. 11 is a graph showing the control characteristics of the fourth embodiment.

DETAILED DESCRIPTION OF THE INVENTION

Figure 1:
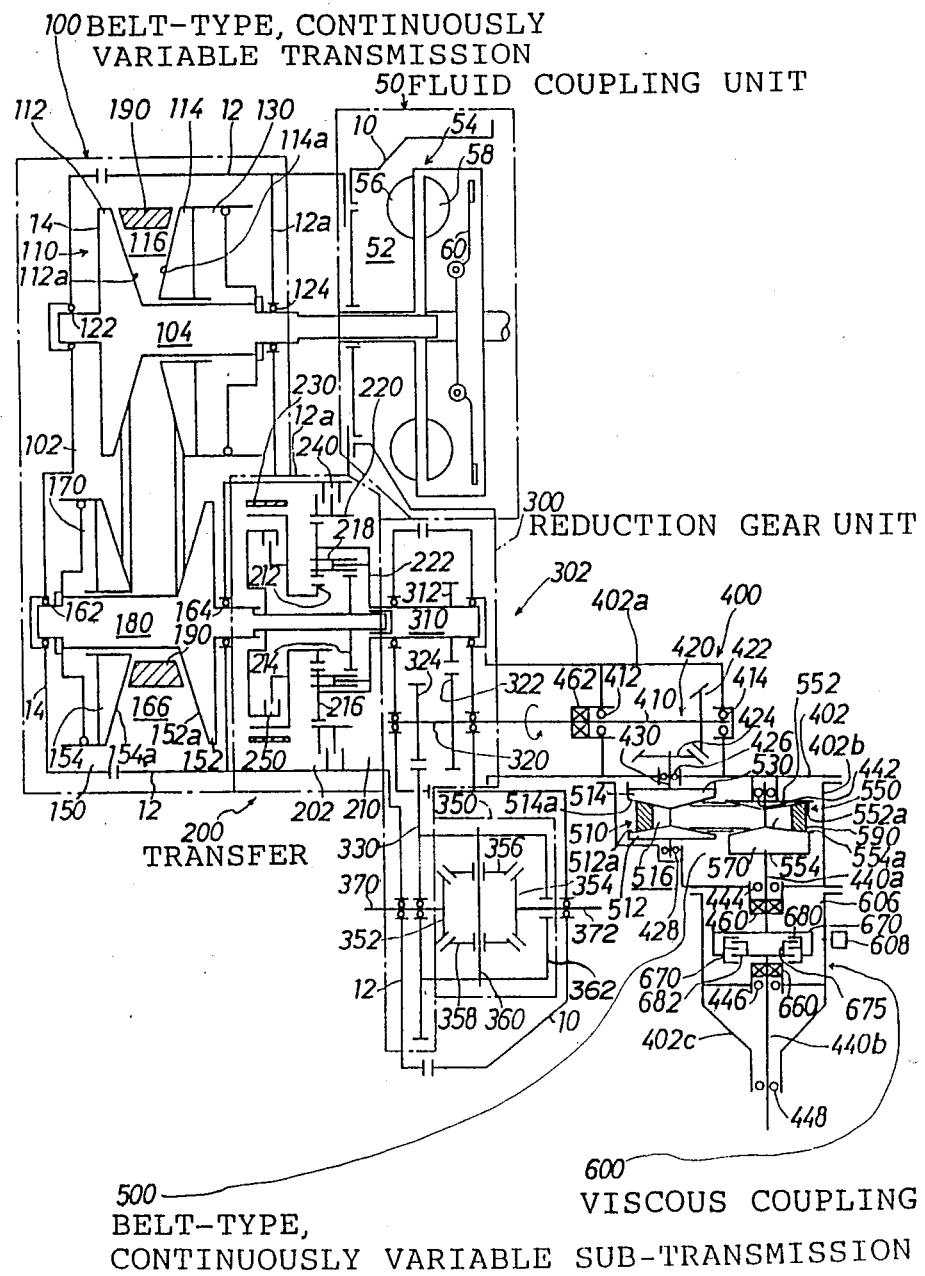
FIG. 1 is a block diagram of the first embodiment of a four-wheel-driving system according to the present invention.
Figure 2:
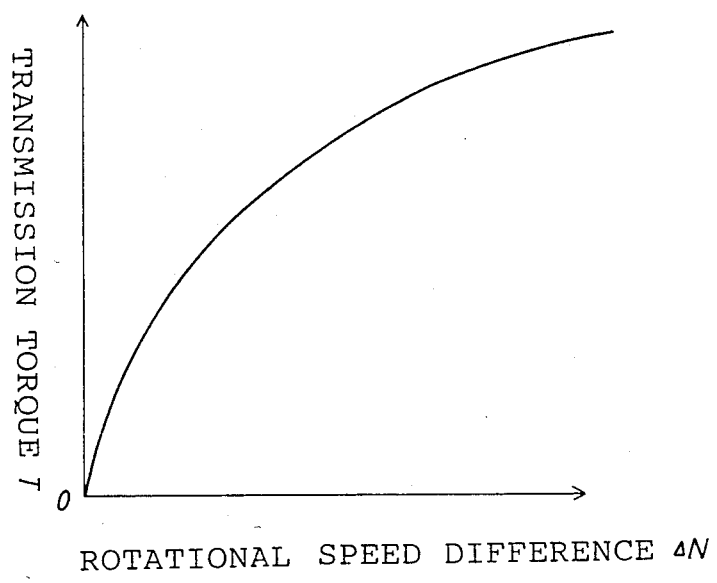
FIG. 2 is a graph showing the characteristics of the transmission torque of the viscous coupling used in the present invention.

FIG. 1 shows a block diagram of a first embodiment of a four-wheel-driving system according to the present invention. The driving system of this embodiment is based on a horizontal front engine front wheel drive type, and has a fluid coupling unit 50, a belt-type, continuously variable transmission 100 as a main transmission, a transfer 200, a reduction gear unit 300, and a differential gear unit 350 which all are the basic structure for front wheel drive. Besides, the system has a power take-off for rear wheel drive 400, a belt type continuously variable sub-transmission 500, and a viscous coupling 600 for distributing driving power between front and rear wheels. The respective units for front wheel drive are provided in case members for the transmission. The case members are a fluid coupling case member 10, a main case member 12, and a cover member 14 which form chambers in which the devices are provided. The fluid coupling case member 10 forms a chamber 52 for the fluid coupling unit 50. The main case 12 and the cover member 14 form a chamber 102 for the main transmission 100. The underpart of the main case member 12 forms a chamber 202 for the transfer 200. Similarly, the underpart of the case member 10 forms a differential gear case 302 for the reduction gear unit 300 and the reduction gear device 350. The power take-off for rear wheel drive 400 and the subtransmission 500 are provided in a case 402 which is installed on the fluid coupling case member 10.

The fluid coupling unit 50 comprises a fluid coupling 54 and a lock-up clutch 60. The coupling 54 comprises a pump runner 56 and a turbine runner 58. The pump runner 56 is connected to an engine crank shaft (not shown), and the turbine runner 58 connected to a live axle 104 of input pulley 110 which is an input axle of the main transmission 100. As is universally known, the fluid coupling 54 transmits motive power through fluid (oil). In this embodiment, the coupling 54 transmits rotational power of the engine to the main transmission 100.

The clutch 60 transmits rotational power of the engine directly to the input pulley 110 of the live axle 104. When the power is transmitted by the coupling 54, the transmitted power decreases because the coupling 54 is a fluid transmission having slippage. By the clutch 60, there is no slippage, and the power is transmitted directly. The clutch 60 is provided for improvement of the fuel consumption rate, and is engaged during high speed running.

The main transmission 100 comprises an input pulley 110 and an output pulley 150. The input pulley 110 comprises an immovable pulley 112 and a movable pulley 114. The immovable pulley 112 is integrated with the live axle 104. The movable pulley 114 is coupled with the live axle 104 so as to move independently in the longitudinal direction of the live axle 104, however the pulley 114 is correlated with the rotation thereof.

Both ends of the live axle 104 are supported rotatably by the partition member 12a of the main case member 12 through a bearing 124, and the cover member 14 through a bearing 122.

Opposed pulley surfaces 112a and 114a of the immovable pulley 112 and the movable pulley 114 form a peripheral channel 116 of a V-section. A driving belt 190 is wound around the peripheral channel 116. The width of the channel is varied by moving the movable pulley 114 in the direction of the live axle 104, thereby varying the effective diameter in which the driving belt 190 is wound around. The movable pulley 114 is moved in the transverse direction by a hydraulic cylinder 130 at the rear of the pulley 114.

The output pulley 150 has almost the same structure as the input pulley 110. Namely, the output pulley comprises an immovable pulley 152 and a movable pulley 154. The movable pulley 154 is engaged with the live axle 180 which is integrated with the immovable pulley 152. In like manner of the movable pulley 114 of the input pulley 110, the pulley 154 is correlated to the rotation of the axle 180, but is independently movable in the longitudinal direction of the axle 180.

Both ends of the live axle 180 of the output pulley 150 are supported rotatably by the partition member 12a of the main case member 12 through a bearing 164, and the cover member 14 through a bearing 162, similar to the input pulley 110. Further, the right end of the live axle 180 is engaged detachably with an output axle 310 of the transfer 200 and the reduction gear unit 300.

Opposed surfaces 152a, 154a of the immovable pulley 152 and the movable pulley 154 form a peripheral channel 166 of a V-section into which the driving belt 190 is put. Also in the output pulley 150, upon movement of the movable pulley 154, the effective diameter of the position where the belt 190 runs is varied. The movement of the pulley 154 is controlled by a hydraulic cylinder 170 at the rear of the pulley 154.

In the output pulley 150, the immovable pulley 152 and the movable pulley 154 are disposed oppositely to those of the input pulley 110, in order to keep the driving belt 190 approximately perpendicular to the two axles 104 and 180, even if the peripheral channels 116 and 166 are changed in width.

The driving belt 190, whose structure is not shown in detail in the figures, comprises a pair of endless carriers and power transmission blocks. The endless carriers include a plurality of metal hoops, and the blocks are closely provided on the carriers.

In the main transmission 100 of the above-mentioned structure, the power is transmitted from the input pulley 110 to the output pulley 150 through the driving belt 190. Since the effective diameter of the input pulley 110 is varied, the power transmitted to the output pulley 150 is continuously varied. The input pulley 110 and the output pulley 150 rotate in the same direction.

The transfer 200 provided at the output side of the main transmission 100 comprises a Ravigneaus-type composite planetary gear unit 210, two brakes 230 and 240, and a clutch 250. The brake 240 and the clutch 250 are of well-known multi-disc frictional type, and the brake 230 is of a wellknown band brake type.

The planetary gear unit 210 comprises first and second sun gears 212 and 214, a first planetary gear 216 engaging with the sum gear 212, a second planetary gear 218 engaging with the first planetary gear 216 and the second sun gear 214, a ring-gear 220 engaging with the first planetary gear 216, and a carrier 222 supporting rotatably the first planetary gear and the second planetary gear 218.

All the above-mentioned elements of the planetary gear unit 210, the two brakes 230 and 240, and the clutch 250 are located and connected between the live axle 180 of the output pulley 150 and the output axle 310 of the reduction gear unit 300, in the following manner. The first sun gear 212 is coupled through the clutch 250 to the live axle 180 which is coupled directly to the second sun gear 214 by a spline coupling. The first sun gear 212 has the brake 230 near the partition member 12a. Similarly, the ring-gear 220 has the brake 240 near the partition member 12a. The carrier 222 as an output member is coupled with the output axle 310 of the reduction gear unit 300 by a spline coupling. Having the above-mentioned structure, the transfer 200 effects two shift positions for forward and one shift position for reverse by operating selectively the brakes 230 and 240, and the clutch 250. For example, in order to effect the first forward shift position, the brake 230 is operated, and the clutch 250 and the brake 230 are nonoperational. Under this condition, the second sun gear 214 is rotated, the revolution of the first planetary gear 216 around the ring-gear 220 is reversed, reduced, and taken off by the carrier 222.

In the reduction gear unit 300, a gear 312 provided on the output axle 310 engages with a first gear 322 of a counter shaft 320, and a second gear 324 thereof engages with a final reduction-gear 330. These gears are engaged so as to reduce a rotation input to the reduction gear unit 300. Therefore, a rotation from the transfer 200 is reduced by the reduction gear unit 300 and transmitted to the differential gear unit 350. The rotation is finally reduced between the second gear 324 and the final reduction gear 330.

The differential gear unit 350 is provided at the final reduction gear 330. The unit 350 has a well-known structure. That is, a pair of left and right side gears 352 and 354 engage respectively with pinions 356 and 358 supported by a pinion shaft 360. The rotational power from a differential case 362 is transmitted to the side gears 352 and 354 through the pinion shaft 360 and the pinions 356 and 358, and further transmitted through driving axles 370 and 372 to the front wheels (not shown). The differential rotations of the right and left front wheels (not shown) are permitted by the rotations of pinions 356 and 358.

The power take-off for rear wheels 400 takes power off from the counter shaft 320 of the reduction gear unit 300. That is, a power-take-off axle for rear wheels 410 is connected to the counter shaft 320 and rotates integrally therewith. The axle 410 is rotatably supported through bearings 412 and 414 by a first case member 402a of the case member for the power take-off 402.

As shown in FIG. 1, a bevel gear 422 is fixed integrally with the right end of the axle 410. An axle 430 provided at a right angle to the axle 410 has another bevel gear 424 which is in mesh with the bevel gear 422, thereby transmitting the rotational power of the axle 410 to the axle 430. The axle 430 is coupled with the sub-transmission 500. The sub-transmission 500 is also coupled with a driving axle for rear wheels 440, thereby transmitting the power of the axle 430 to the driving axle 440. The bevel gears 422 and 424 have the same number of teeth, thereby maintaining the rotational speed of the axle 410.

The driving axle 440 has a viscous coupling 600 through which the driving power added to the axle 440 is transmitted to the rear wheels. The axle 430 is supported rotatably at a second case member 402b of the case member for the power take-off 402 through bearings 426 and 428. The driving axle for rear wheels 440 is supported rotatably by the second case member 402b and a third member 402c of the case member 402 through bearings 442, 444, 446, and 448. Also, in FIG. 1, the numerals 460 and 462 designate seal members.

The sub-transmission 500 comprises an input pulley 510 and an output pulley 550 like the main transmission 100. The input pulley 510 comprises an immovable pulley 512 and a movable pulley 514. The immovable pulley 512 is integrated with the axle 430. The movable pulley 514 is engaged with the axle 430 and is movable in the direction of the axle 430, but correlated to the rotation of the axle 430.

Opposed pulley surfaces 512a and 514a of the immovable pulley 512 and the movable pulley 514 form a peripheral channel 516 of a V-section. A driving belt 590 is wound around the peripheral channel 516. The width of the channel is varied by moving the movable pulley 514 in the direction of the axle 430, thereby varying the effective diameter in which the driving belt 590 is wound around. The movable pulley 514 is moved in the axle direction by a hydraulic cylinder 530 provided at the rear thereof.

The output pulley 550, having the almost same structure as the input pulley 510, comprises an immovable pulley 552 and a movable pulley 554. The movable pulley 554 is engaged with the driving axle for rear wheels 440 which is integrated with the immovable pulley 552. In a like manner of the movable pulley 514 of the input pulley 510, the pulley 554 is movable in the direction of the driving axle 440, but correlated to the rotation thereof.

Opposed surfaces 552a, 554a of the immovable pulley 552 and the movable pulley 554 form a peripheral channel 566 of a V-section in which the driving belt 590 is run. Also in the output pulley 550, upon the movement of the movable pulley 554 in the direction of the axle 440, the effective diameter of the position where the belt 590 is run varies. The movement of the pulley 554 is controlled by a hydraulic cylinder 570 provided at the rear of the pulley 554.

The driving belt 590 has the same structure as the above-mentioned driving belt 190.

In the sub-transmission 500 of the above-mentioned structure, the power is transmitted from the input pulley 510 to the output pulley 550 through the driving belt 590. Since the effective diameter of the input pulley 510 is varied, the power transmitted to the output pulley 550 is continuously varied. The input pulley 510 and the output pulley 550 rotate in the same direction.

Figure 3:
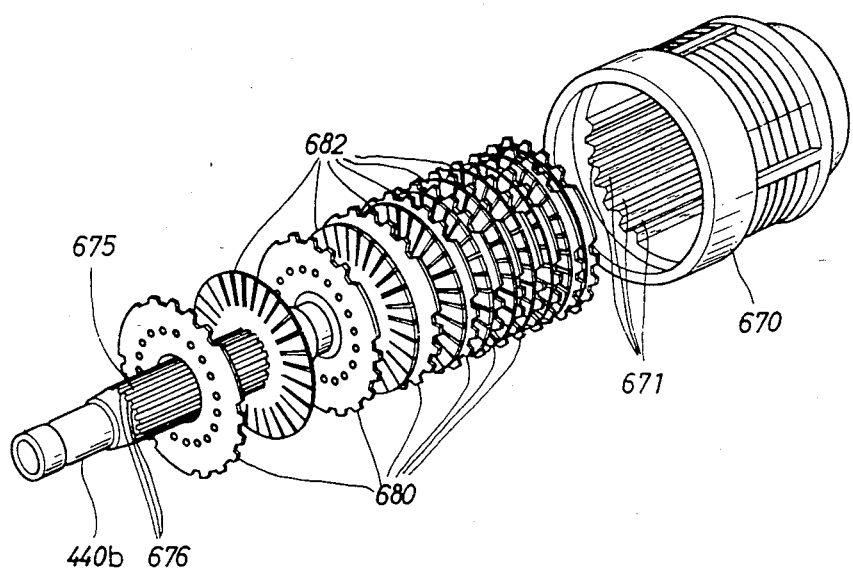
FIG. 3 is a exploded prespective view of the viscous coupling.

The viscous coupling 600 is provided in an oil chamber 606 surrounded by the third case member 402c and seal members 460 and 660. The oil chamber 606 is filled with silicon oil in order to give viscosity to the viscous coupling 600. In the oil chamber 606, an oil temperature sensor 608 is installed to detect the temperature of the silicon oil. The driving axle 440a extending from the sub-transmission 500 is inserted into the oil chamber 606 through the seal member 460, and is coupled with a cylindrical housing 670. As shown in FIG. 3, the housing 670 has a serration 671 therein to fix a number of housing plates 680. The driving axle 440b extending from rear wheels, which is inserted into the chamber 606 through the seal member 660, has a hub 675 including a serration 676 therearound to fix a number of hub plates 682. The two kinds of plates 680 and 682 are alternatively provided between the housing 670 and the hub 675. The silicon oil lies between the plates 680 and 682 in order to transmit driving power by the viscosity thereof from the housing 670 to the hub 675.

Figure 4:
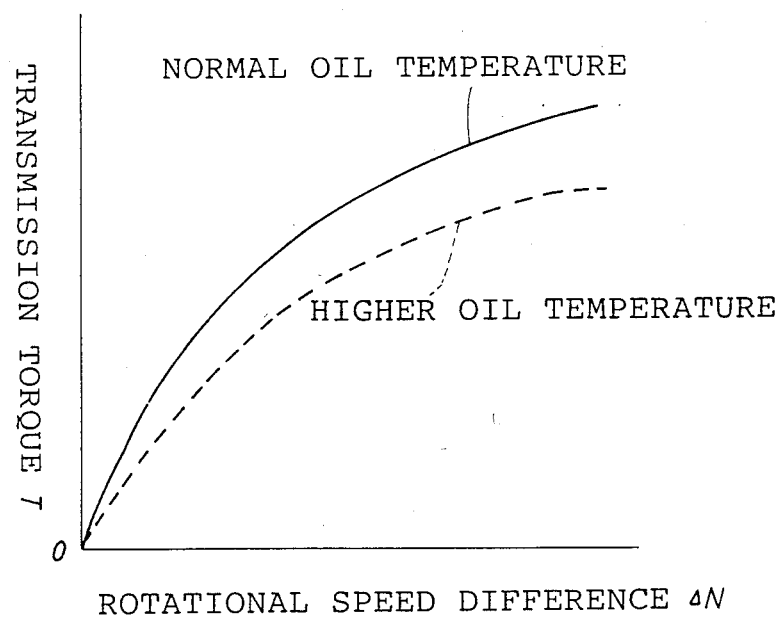
FIG. 4 is a graph showing the characteristics of the transmission torque of the viscous coupling of the first embodiment.

FIG. 4 shows a graph illustrating the transmission characteristics of the driving power of the viscous coupling 600. The graph, which has a transmission torque T as the ordinate and a rotational speed difference $\Delta N$ as the abscissa, shows characteristics of transmission torque T at both normal and higher oil temperatures. As shown in FIG. 4, the transmission torque T varies directly with the rotational speed difference $\Delta N$, and inversely with the oil temperature.

Figure 5:
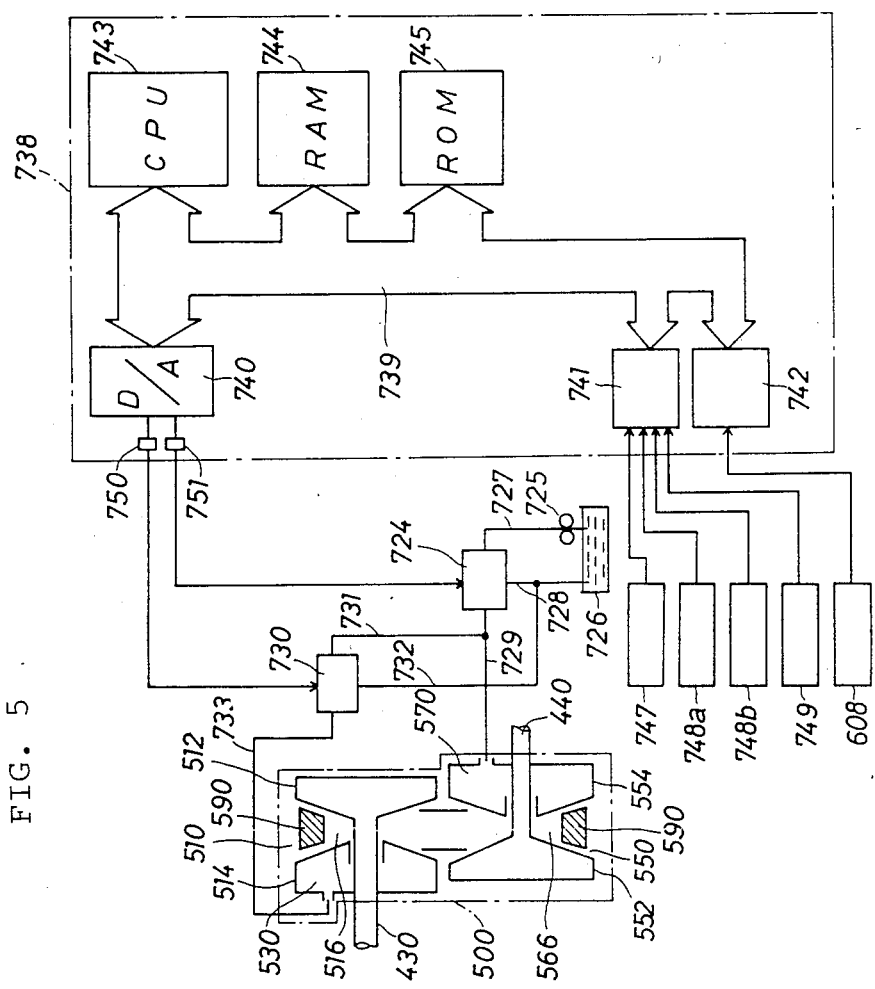
FIG. 5 is a diagram of the belt-type, continuously variable transmission as a sub-transmission, and the control device thereof.
Figure 6:
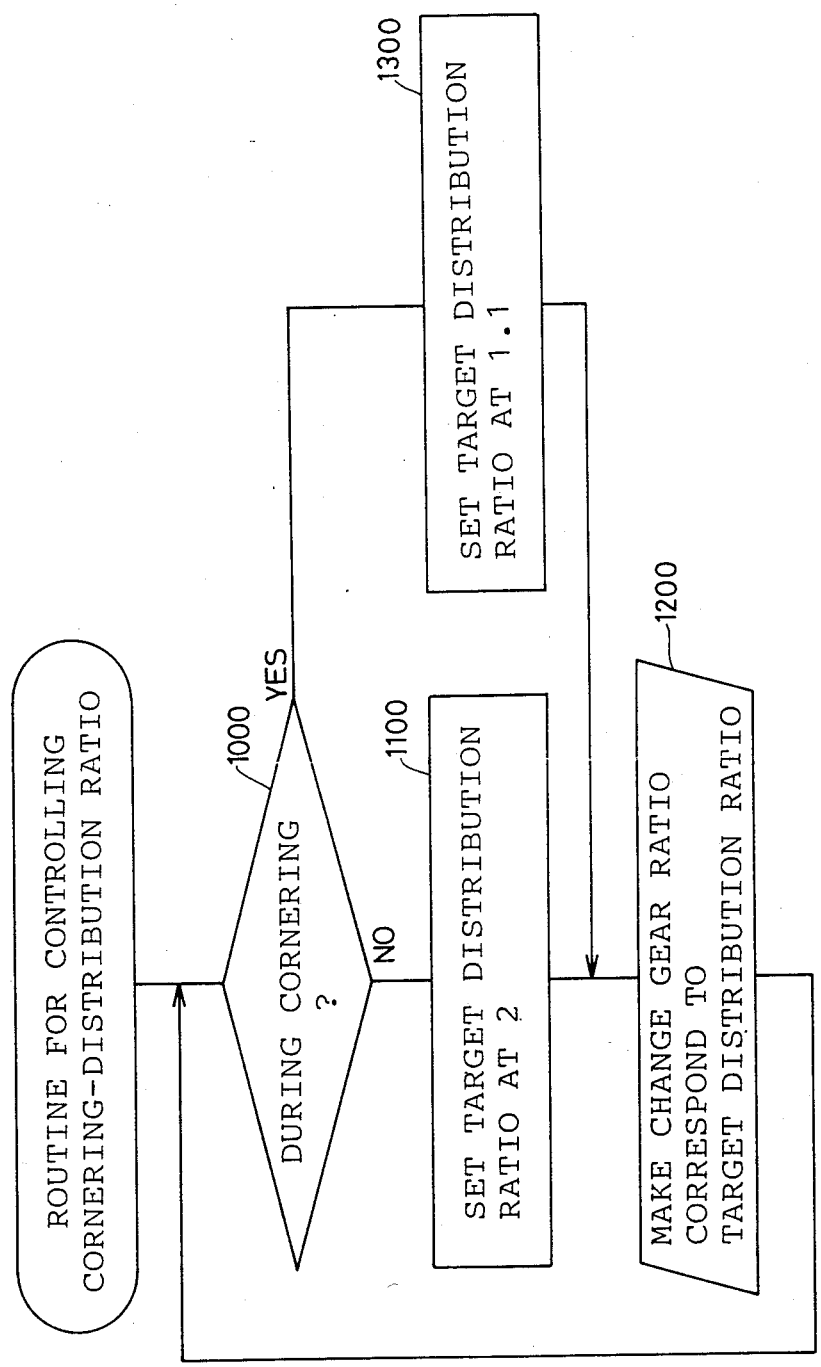
FIG. 6 is a flowchart showing the control of corneringdistribution ratio executed in the first embodiment.
Figure 7:
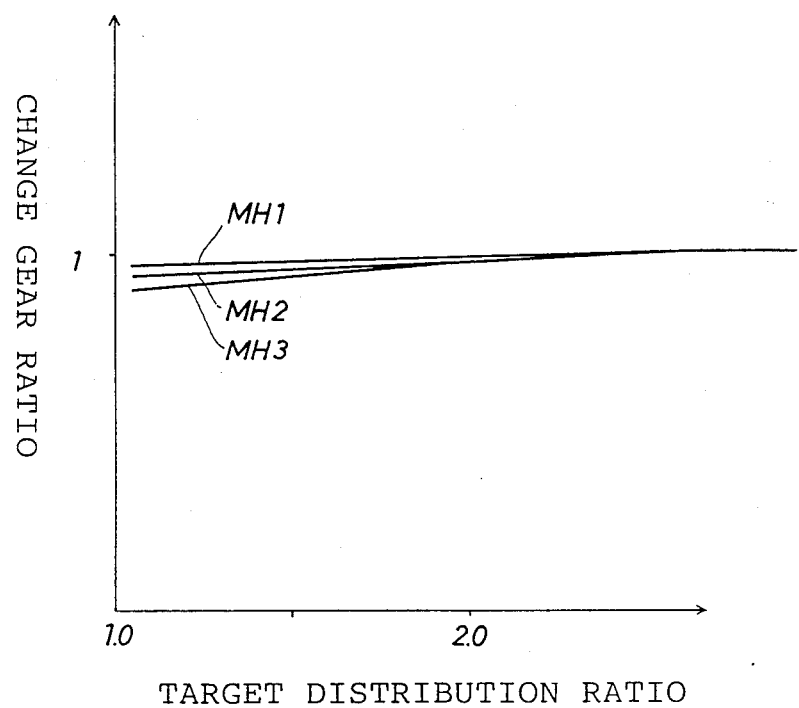
FIG. 7 is a graph showing the control characteristics of the first embodiment.

FIGS. 5 thru 7 show a control structure of the four-wheel-driving system as shown as shown in FIG. 1. FIG. 5 shows an actuator which controls variably the change gear ratio of the sub-transmission 500. The actuator controls oil pressures of the hydraulic cylinders 530 and 570 of the input and output pulleys 510 and 550. In accordance with changing the oil pressures of the cylinders 530 and 570, the movable pulleys 514 and 554 are moved, thereby changing the effective diameters of the channels 516 and 566 in which the belt 590 is wound.

A line-pressure-regulating valve 724 controls line pressure Pl added to the hydraulic cylinder 570 of the output pulley 550. Oil as the hydraulic fluid in a reservoir 726 is sent through an oil line 727 to the valve 724 by an oil pump 725. The valve 724 controls the oil amount flowing into an oil line 728, thereby adjusting the line pressure Pl in the line 729. A flow control valve 730 controls the oil pressure added to the hydraulic cylinder 530. In order to maintain the change gear ratio of the sub-transmission 500 constant, an oil line 733 is disconnected from an oil line of line pressure 731 branching off from the line 729, and a drain oil line 732, thereby maintaining the position of the movable pulley 514 for input. In order to reduce the change gear ratio, oil is supplied from the oil line 731 to the oil line 733, thereby increasing the thrust of the input pulley 510. In order to increase the change gear ratio, the oil pressure of the movable pulley 514 is released through the drain oil line 732 at atmosphere pressure, thereby decreasing the thrust of the input pulley 510. Although the oil line 733 has less oil pressure than the line pressure Pl, the piston area upon which oil pressure acts of the hydraulic cylinder 530 is larger than that of the hydraulic cylinder 570, thereby making the thrust force of the input pulley 510 greater than that of the output pulley 550.

The change gear ratio of the sub-transmission 500 is controlled by an electronic control unit (ECU) 738. The ECU 738 comprises an address data bus 739 which interconnects the followings: a digital-to-analog (D/A) converter 740, an input interface 741, an analog-to-digital (A/D) converter 742, a central processing unit (CPU) 743, a random access memory (RAM) 744, and a read only memory (ROM) 745.

The oil temperature sensor 608 in the viscous coupling 600 outputs the signal indicative of the oil temperature to the A/D converter 742. Signals from the following are input to the input interface 741: a cornering sensor 747 which detects cornering in response to the rotational angle of a steering wheel (not shown), a distribution-ratio-setting switch 748a by which the ratio is set manually, a speed sensor 748b which detects the speed of the vehicle, and a starting sensor 749 which detects starting from acceleration thereof. The D/A converter 740 outputs to the flow control valve 730 through an amplifier 750, and to the valve for generating the line pressure 724 through another amplifier 751.

By the above-described structure as shown in FIG. 5, the flow control valve 730 and the line-pressure-regulating valve 724 are controlled to be opened a predetermined degree in response to the change gear ratio.

FIG. 6 shows a routine for controlling the distribution ratio (driving power for front wheels/driving power for rear wheels) by which the distribution ratio is controlled to enlarge the driving power applied to the rear wheels when a vehicle corners. When the vehicle is going straight, that is, when a vehicle isn't cornering (Step 1000), the target distribution ratio is set at 2 to increase the driving power to the front wheels above that for the rear wheels (Step 1100), thereby raising stability when the vehicle goes straight. The gear change ratio (rotational) speed of the input pulley / that of the output pulley) is calculated corresponding to the target distribution ratio 2 as shown in FIG. 7 which will be explained later. The change gear ratio of the sub-transmission 500 is controlled in accordance with this target gear change ratio(Step 1200). On the other hand, when the vehicle corners (Step 1000), the target distribution ratio is set at 1.1, that is, the driving power for the front wheels and that for the rear wheels are approximately equalized to improve the cornering characteristics. Also, the change gear ratio is set in response to the distribution ratio 1.1 (Step 1200).

FIG. 7 shows a graph illustrating the relationship of the target distribution ratio and the change gear ratio when the vehicle runs normally. In FIG. 7, three characteristics curves MH1, MH2, and MH3 indicate that the larger the target distribution ratio becomes, the closer to 1 the change gear ratio becomes. The characteristic curve MH1 is for high speed, the curve MH2 for medium speed, the curve MH3 for low speed.

According to the above-described first embodiment, the change gear ratio of the sub-transmission 500 is adjusted to set the transmission torque T of the viscous coupling at the predetermined value, thereby controlling variably the distribution ratio of the driving powers between front and rear wheels. Therefore, it is possible to adjust the distribution ratio suitably to driving conditions such as cornering, and condition of road surface. Additionally, the present invention has no center differential, the change of rotation of the output axle of the main transmission 100 is reduced, the weight of the apparatus lightened, and the vibration thereof reduced.

When driving conditions cause the slip degree of the coupling 600 to increase thus causing the driving power distributed to the rear wheels to increase, the control system causes the change gear ratio of the sub-transmission 500 to decrease, resulting in a decrease in the torque applied to the front wheels. The present invention, therefore, provides control to increase the output torque of the main transmission 100, i.e., the change gear ratio in order to make up for the decrement of the torque applied to the driving wheels. Since the viscous coupling transmits torque with a relatively small rotational speed difference $\Delta N$, it is possible to compensate for the decrease in the torque to the driving wheels by increasing the rotational speed of the main transmission 100 slightly. Additionally, in order to make up for the decrease of the rotational speed of the main transmission 100, the speed of an engine (not shown) may be increased.

As described above, by controlling automatically the engine, the main transmission 100, the sub-transmission 500, and the viscous coupling 600, it is possible to provide the four-wheel-driving system of excellent drivability.

Figure 8:
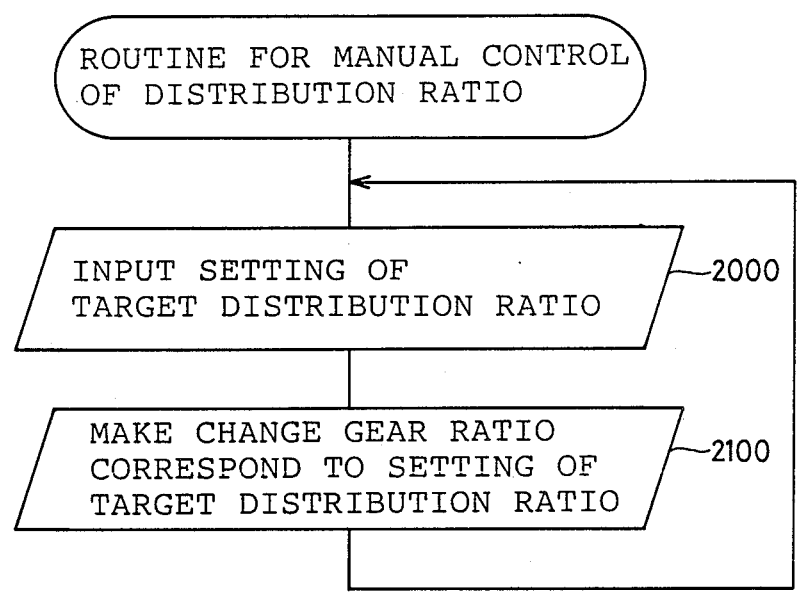
FIG. 8 is a flowchart showing the manual control of distribution ratio executed in the second embodiment.

FIG. 8 shows a second embodiment which is a second control structure using the construction of the first embodiment, in which the distribution ratio between the front and rear wheels is controlled manually. The setting value is input from the distribution-ratio-setting switch 748a (Step 2000), and the change gear ratio is controlled (Step 2100). According to the second embodiment, a driver can set the desired distribution ratio of driving power between the front and rear wheels.

Figure 9:
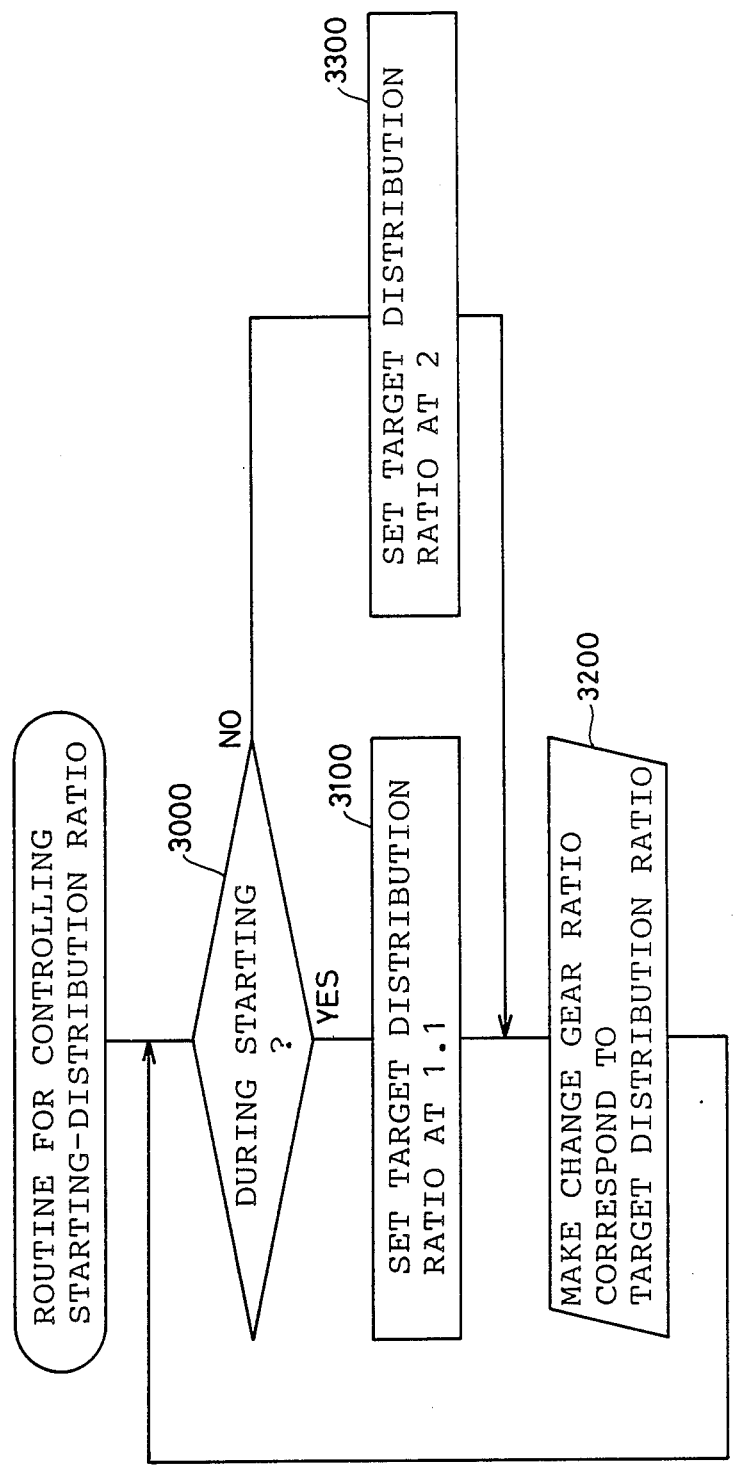
FIG. 9 is a flowchart showing the control of starting-distribution ratio executed in the third embodiment.

FIG. 9 shows a third embodiment showing a third control structure which distributes more driving power than usual to the rear wheels when the vehicle starts out. Namely, during starting (Step 3000), the target distribution ratio is set at 1.1 (Step 3100), the change gear ratio of the subtransmission 500 is made to correspond to the target distribution ratio (Step 3200), thereby distributing more driving power than usual to the rear wheel. On the other hand, when the vehicle is not in a starting condition (Step 3000), the target distribution ratio is set at 2 (Step 3300), the change gear ratio of the sub transmission 500 is made to correspond to the target distribution ratio (Step 3200). According to the present embodiment, it is possible to provide large driving power to rear wheels when a vehicle is starting, thereby facilitating smooth starting.

Figure 10:
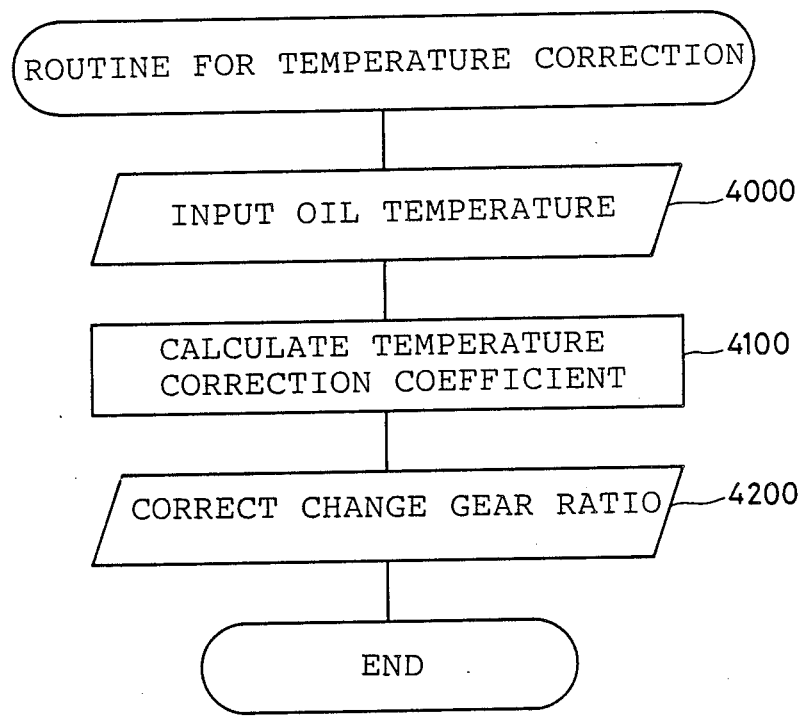
FIG. 10 is a flowchart showing the temperature correction executed in the fourth embodiment.

FIGS. 10 and 11 show a fourth embodiment, in which the temperature of the viscous coupling 600, is corrected. In the viscous coupling 600, the viscosity of silicon oil as a medium transmitting torque decreases according to the temperature increase thereof, thereby decreasing the transmitted torque, thereby undesirably changing the distribution ratio. In this embodiment, initially the oil temperature is input (Step 4000), a temperature correction coefficient corresponding to the oil temperature is calculated based upon the graph of FIG. 11 (Step 4100), and the change gear ratio is multiplied by the correction coefficient (Step 4200), thus correcting the change of the distribution ratio caused by rising of the oil temperature.

The graph of FIG. 11 has the oil temperature as the abscissa and the temperature correction coefficient as ordinate. The correction coefficient is 1 or below. The higher the oil temperture rises, the smaller the correction coefficient becomes, thereby decreasing the change gear ratio ($\omega$in /$\omega$out) and increasing the transmission torque.

As described above, this embodiment compensates for the change of the distribution ratio of the driving power caused by the rising of the oil temperture of the viscous coupling 600. As a result, it is possible to provide a four-wheel-driving system which can always correctly control the distribution ratio.

Although particular preferred embodiments of the invention have been disclosed in detail for illustrative purposes, it will be recognized that variations or modifications of the disclosed system, including the rearrangement of parts, lie within the scope of the present invention.

What is claimed is:

1. A four-wheel-driving system having two driving axles which transmit driving torque provided from a continuously variable main transmission respectively to front and rear wheels, comprising:
    a continuously variable sub-transmission coupled to one of said two axles;
    a viscous coupling coupled to one of said two axles, said viscous coupling transmitting torque is accordance with a rotational speed difference between an input and an output of the viscous coupling; and
    control means for variably controlling the ratio of said driving torque distributed between said front and rear wheels by controlling a change gear ratio of said continuously variable sub-transmission and for increasing a continuously variable main transmission ratio while decreasing said continuously variable sub-transmission ratio.

2. A four-wheel-driving system according to claim 1, wherein said viscous coupling transmits said torque in relation to a speed difference between an input and an output thereof.

3. A four-wheel-driving system according to claim 1, wherein said driving power distributed to the rear wheels is increased during cornering.

4. A four-wheel-driving system according to claim 1, wherein said distribution ratio is controlled manually.

5. A four-wheel-driving system according to claim 1, wherein said driving power distributed to the rear wheels is increased during starting.

6. A four-wheel-driving system according to claim 1, further including means compensating for a change of said distribution ratio caused by the viscosity of said viscous fluid in said viscous coupling changing with the temperature of said fluid.

7. A four-wheel-driving system according to claim 1, wherein said viscous coupling comprises a plurality of plates rotatably mounted within said coupling.

8. A method for controlling a ratio of driving torque distributed between a set of front wheels and a set of rear wheels, comprising the steps of:
    transmitting said driving torque provided from a continuously variable main transmission to one of said sets of wheels;
    transmitting said driving torque to the other set of wheels through a continuously variable subtransmission;
    transmitting torque from said continuously variable subtransmission to said other set of wheels through a viscous coupling;
    controlling a change gear ratio of said continuously variable subtransmission to variable control said distribution ratio; and
    increasing a continuously variable main transmission ratio during decrease of said continuously variable subtransmission ratio.

9. A four-wheel-driving system having two driving axles which transmit driving torque from a continuously variable main transmission respectively to front and rear wheels, comprising:
    a continuously variable sub-transmission coupled to said axle of said rear wheel;
    a viscous coupling coupled to said continuously variable sub-transmission, said viscous coupling transmitting torque in accordance with a rotational speed difference between an input and an output of the viscous coupling; and
    control means for variably controlling the ratio of said driving torque distributed between said front and rear wheels by controlling a change gear ratio of said continuously variable sub-transmission and for increasing a continuously variable main transmission ratio during decreasing said continuously variable sub-transmission ratio.

* * * * *